US012776179B1

(12) United States Patent

Du

(10) Patent No.: US 12,776,179 B1

(45) Date of Patent: Oct. 27, 2026

(54) APP-LESS VISITOR PREVIEW AND ACCESS CONTROL SYSTEM

(71) Applicant: Zheng Du, Irvine, CA (US)

(72) Inventor: Zheng Du, Irvine, CA (US)

(73) Assignee: EntryOne Systems, Inc, Newport Beach, CA (US)

( * ) Notice: Subject to any disclaimer, the term of this patent is extended or adjusted under 35 U.S.C. 154(b) by 0 days.

(21) Appl. No.: 19/281,771

(22) Filed: Jul. 28, 2025

(51) Int. Cl.
*G07C 9/32* (2020.01)
*G07C 9/00* (2020.01)

(52) U.S. Cl.
CPC ........... *G07C 9/32* (2020.01); *G07C 9/00571* (2013.01)

(58) Field of Classification Search
None
See application file for complete search history.

(56) References Cited

U.S. PATENT DOCUMENTS 9,830,790 B2 * 11/2017 Jones ..................... H04N 7/186
10,327,035 B2 * 6/2019 Zerr ................... H04N 21/2143
10,454,927 B2 * 10/2019 Oberhauser ............. G06F 21/62
10,984,620 B2 * 4/2021 Lee .................... G07C 9/00309
11,108,998 B2 8/2021 Neshumov
12,477,086 B2 11/2025 Lane
2012/0044050 A1 2/2012 Vig
2018/0282114 A1 * 10/2018 Baldi .................... B66B 1/3461
2018/0286157 A1 * 10/2018 Simcik ..................... G07C 9/27
2020/0349786 A1 11/2020 Ho
2021/0142601 A1 * 5/2021 Schoenfelder ......... G05B 15/02
2022/0254212 A1 8/2022 Schoenfelder
2023/0177901 A1 * 6/2023 Lima .................. G07C 9/00309 340/5.61
2023/0215233 A1 * 7/2023 Bodell ............... G07C 9/00904 340/5.6
2024/0267686 A1 8/2024 Lyons

FOREIGN PATENT DOCUMENTS

CA 3118110 A1 * 4/2022 ............... H04N 7/14
CN 117994888 A * 5/2024 ............. G10L 15/22
EP 3039659 B1 6/2022
TW 1684958 B * 2/2020

* cited by examiner

*Primary Examiner* — Fekadeselassie Girma

(57) ABSTRACT

An app-less access control system and method that enables residents to preview visitor identity and make entry decisions without the need for a mobile application. The system delivers either an embedded image or a browser-accessible image link via SMS, optionally in conjunction with a phone call, allowing residents to evaluate visitors through a secure web interface. The resident may admit or deny access through a browser-based command or initiate a live, app-less video call via WebRTC or similar protocol. The access decision is communicated to a cloud-based access control platform, which actuates physical entry mechanisms. This system enhances accessibility, speeds deployment, and simplifies user interaction across all mobile devices without requiring app installation.

30 Claims, 3 Drawing Sheets

A SYSTEM ARCHITECTURE DIAGRAM

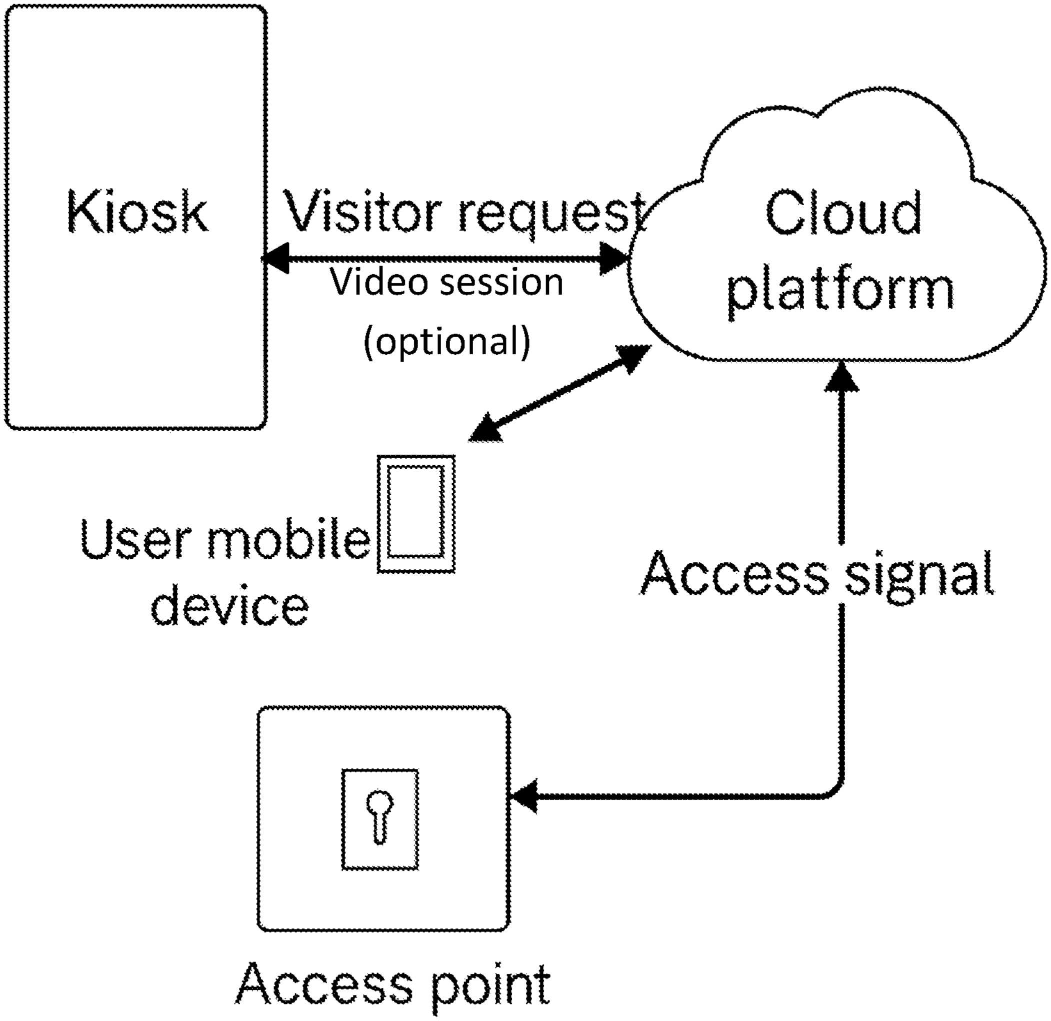
FIG. 1 A SYSTEM ARCHITECTURE DIAGRAM

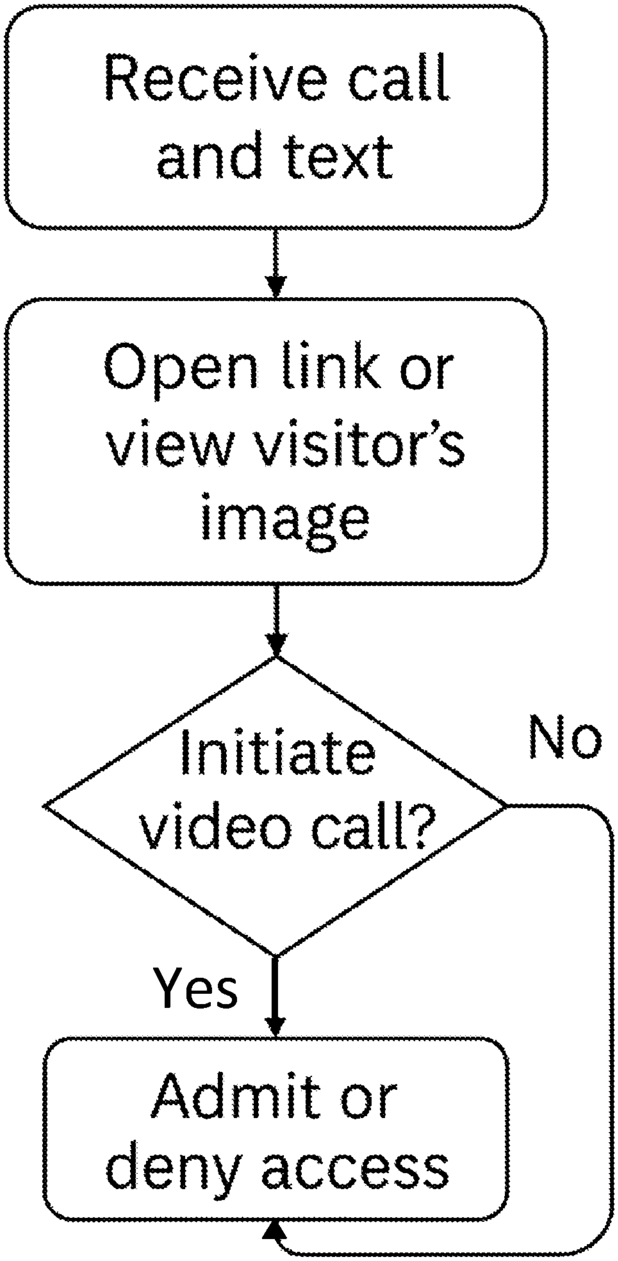
FIG. 2 A RESIDENT INTERACTION FLOW DIAGRAM

PHOTO
VIDEO
Visitor
ADMIT GUEST
DENY ENTRY

FIG. 3 AN ACCESS DECISION INTERFACE

APP-LESS VISITOR PREVIEW AND ACCESS CONTROL SYSTEM

BACKGROUND OF THE INVENTION

Conventional access control systems rely heavily on mobile applications for managing visitor interactions. These systems often require the user to download and configure apps, which can be a barrier to usability. Furthermore, existing systems typically require the resident to answer a live call to verify a visitor's identity. These limitations reduce convenience and accessibility, especially when the resident is busy or in a location with poor cellular signal for app notifications.

SUMMARY OF THE INVENTION

The invention improves access control workflows by leveraging browser-based and SMS-delivered interactions that eliminate the need for native apps. A visitor at a kiosk triggers both a phone call and a simultaneous text message to the resident. The message includes an embedded image or a link to view the visitor, and the resident may choose to grant or deny access directly from the message or during a browser-based video session initiated via WebRTC or similar technology. This simplifies the process and enhances accessibility across all device types.

BRIEF DESCRIPTION OF THE DRAWINGS

FIG. 1 is a system architecture diagram of the access control system.

FIG. 2 is a resident interaction flow diagram showing SMS and video decision paths.

FIG. 3 is an access decision interface.

DETAILED DESCRIPTION

This invention relates to access control and visitor management systems for residential, commercial and enterprise properties. More specifically, it introduces a novel, app-less communication and access workflow between a resident or user and a visitor using standard communication technologies such as SMS and video call, in combination with an intelligent kiosk and cloud-based control platform.

Referring to FIG. 1, the system includes an access kiosk with a camera and connectivity module capable of sending SMS messages and initiating browser-based video calls. When a visitor requests entry, the kiosk sends an image snapshot and initiates a phone call to the designated resident. The SMS message contains either an embedded image or a hyperlink to view the image.

Referring to FIG. 2, the resident may decline the call but still receive the message. By viewing the image or link, the resident can decide to admit or deny the guest without engaging in a live call. If desired, the resident can initiate a browser-based video call using a secure link provided in the message.

Referring to FIG. 3, the access decision interface provides at least one button, 'Admit Guest'. The decision, whether made via SMS message interface or during a browser-based photo and video session, is securely relayed back to the access control unit to actuate entry permissions.

The workflow is supported by a cloud-based software platform managing user databases, temporary credentials, visitor call logs, and device commands. It integrates optional modules like facial recognition, license plate recognition, RFID access, and scheduled access rules.

Security measures include TLS-encrypted communication, tamper detection, audit logging, and revocation of expired or misused guest credentials. Additionally, all access decisions and events are logged and available for property managers or integrators through the EntryOne web portal.

The invention significantly improves usability, deployment speed, and accessibility for users who may not wish to or cannot install smartphone applications. The innovation lies in its seamless integration of browser-based guest interaction, secure visual verification, and cloud-controlled access triggers in a real-time, low-latency system.

Its architecture allows for instant scalability, multi-site support, and centralized management across properties and device types.

The invention claimed is:

1. A method for message-assisted visitor access control for a physical access point, comprising:

receiving, at one or more servers, a visitor access request for a visitor seeking access at the physical access point, the visitor access request including or identifying visual visitor information for visitor;

in response to the visitor access request, causing a voice call to be initiated to a resident device;

substantially concurrently with initiating the voice call, sending a text message to the resident device, wherein the text message provides the resident device with (i) visual visitor verification by at least one of an embedded visitor image, a browser-accessible preview link, or both, and (ii) an access-decision path including a browser-based interface having user-selectable admit and reject controls, the access-decision path being made available without requiring a preinstalled native access-control application on the resident device;

receiving, from the resident device through the access-decision path, a resident admit or reject decision based at least in part on the visual visitor verification, wherein the resident admit or reject decision is received without requiring the resident to answer the voice call;

and based on an admit decision, causing an access control device to actuate a gate, door, or other physical access mechanism.

2. The method of claim 1, wherein the text message includes the browser-accessible preview link, and wherein, after the resident device accesses the browser-accessible preview link, the method further comprises initiating a browser-based video session associated with the visitor access request using a browser-supported real-time communication protocol; providing a video interface in a standard browser on the resident device including controls to accept or reject the video session and to admit or reject access; and executing an access operation based on resident input without requiring installation of a dedicated application on the resident device.

3. The method of claim 1, wherein the visitor image is embedded directly in the SMS message to the resident.

4. The method of claim 1, wherein the resident admit or reject decision is received via a user-selectable control rendered in the browser-based interface.

5. The method of claim 1, wherein the resident can preview the visual visitor information before answering the voice call.

6. The method of claim 1, wherein the voice call is routed via VoIP through the one or more servers.

7. The method of claim 2, wherein the browser-based video session uses a browser-supported real-time communication protocol.

8. The method of claim 2, wherein the video interface includes admit and deny buttons within the browser.

9. The method of claim 2, wherein the video session auto-terminates after a predetermined duration.

10. The method of claim 1, wherein the voice call and the text message are initiated based on the same visitor access request and are transmitted to the resident device in parallel.

11. The method of claim 1, wherein a fallback mechanism sends the visual visitor information again if the preview fails.

12. The method of claim 2, wherein the browser-based video session supports two-way audio.

13. The method of claim 1, wherein resident-device authentication is validated via a token or certificate before accepting the resident admit or reject decision.

14. A system for message-assisted visitor access control for a physical access point, comprising:

a visitor-side device associated with the physical access point and configured to generate a visitor access request for a visitor seeking access at the physical access point, the visitor access request including or identifying visual visitor information for the visitor; a resident device; one or more servers configured to: in response to the visitor access request, cause a voice call to be initiated to the resident device;

substantially concurrently with initiating the voice call, send a text message to the resident device, wherein the text message provides the resident device with (i) visual visitor verification by at least one of an embedded visitor image, a browser-accessible preview link, or both, and (ii) an access-decision path including a browser-based interface having user-selectable admit and reject controls, the access-decision path being made available without requiring a preinstalled native access-control application on the resident device;

and receive, from the resident device through the access-decision path, a resident admit or reject decision based at least in part on the visual visitor verification, wherein the resident admit or reject decision is received without requiring the resident to answer the voice call;

and an access control device configured to, based on an admit decision, actuate a gate, door, or other physical access mechanism.

15. The system of claim 14, wherein the resident device comprises a smartphone or tablet.

16. The system of claim 14, wherein the visitor-side device includes a camera configured to capture real-time images.

17. The system of claim 14, wherein the text message sent to the resident device includes a timestamp of the visitor access request.

18. The system of claim 14, wherein the one or more servers maintain an access log including visual visitor information and timestamps.

19. The system of claim 14, wherein the browser-based interface includes the user-selectable admit and reject controls.

20. The system of claim 14, wherein the visual visitor information is displayed in a browser of the resident device by default.

21. The system of claim 14, wherein the physical access mechanism comprises a gate actuator or door strike.

22. The system of claim 14, wherein the resident admit or reject decision is stored locally or remotely for audit purposes.

23. The system of claim 14, wherein the visual visitor information includes geolocation metadata.

24. A non-transitory computer-readable medium storing instructions that, when executed by one or more processors, cause a visitor access control system to: receive, at one or more servers, a visitor access request for a visitor seeking access at a physical access point, the visitor access request including or identifying visual visitor information for the visitor;

in response to the visitor access request, cause a voice call to be initiated to a resident device; substantially concurrently with initiating the voice call, send a text message to the resident device, wherein the text message provides the resident device with (i) visual visitor verification by at least one of an embedded visitor image, a browser-accessible preview link, or both, and (ii) an access-decision path including a browser-based interface having user-selectable admit and reject controls, the access-decision path being made available without requiring a preinstalled native access-control application on the resident device receive, from the resident device through the access-decision path, a resident admit or reject decision based at least in part on the visual visitor verification, wherein the resident admit or reject decision is received without requiring the resident to answer the voice call;

and based on an admit decision, cause an access control device to actuate a gate, door, or other physical access mechanism.

25. The non-transitory computer-readable medium of claim 24, wherein the instructions include rendering a visitor image within an HTML container.

26. The non-transitory computer-readable medium of claim 24, wherein the instructions generate an interface with access control buttons.

27. The non-transitory computer-readable medium of claim 24, wherein the text message comprises a URL linking to a secure preview of the visual visitor information.

28. The non-transitory computer-readable medium of claim 24, wherein the system logs each access decision event.

29. The non-transitory computer-readable medium of claim 24, wherein the system can distinguish between known and unknown visitors.

30. The non-transitory computer-readable medium of claim 24, wherein the visual visitor information and the browser-accessible preview link are transmitted using a secure message format over TLS-encrypted communication.

* * * * *